April 23, 1957 C. W. CURTIS 2,790,073

BALANCED MIXER ARRANGEMENT

Filed Aug. 1, 1955

INVENTOR.
CHARLES W. CURTIS,
BY
Henry Heyman
ATTORNEY.

United States Patent Office 2,790,073

Patented Apr. 23, 1957

2,790,073

BALANCED MIXER ARRANGEMENT

Charles W. Curtis, Manhattan Beach, Calif., assignor to Hughes Aircraft Company, Culver City, Calif., a corporation of Delaware Application August 1, 1955, Serial No. 525,630

4 Claims. (Cl. 250—13)

Figures 1, 2:
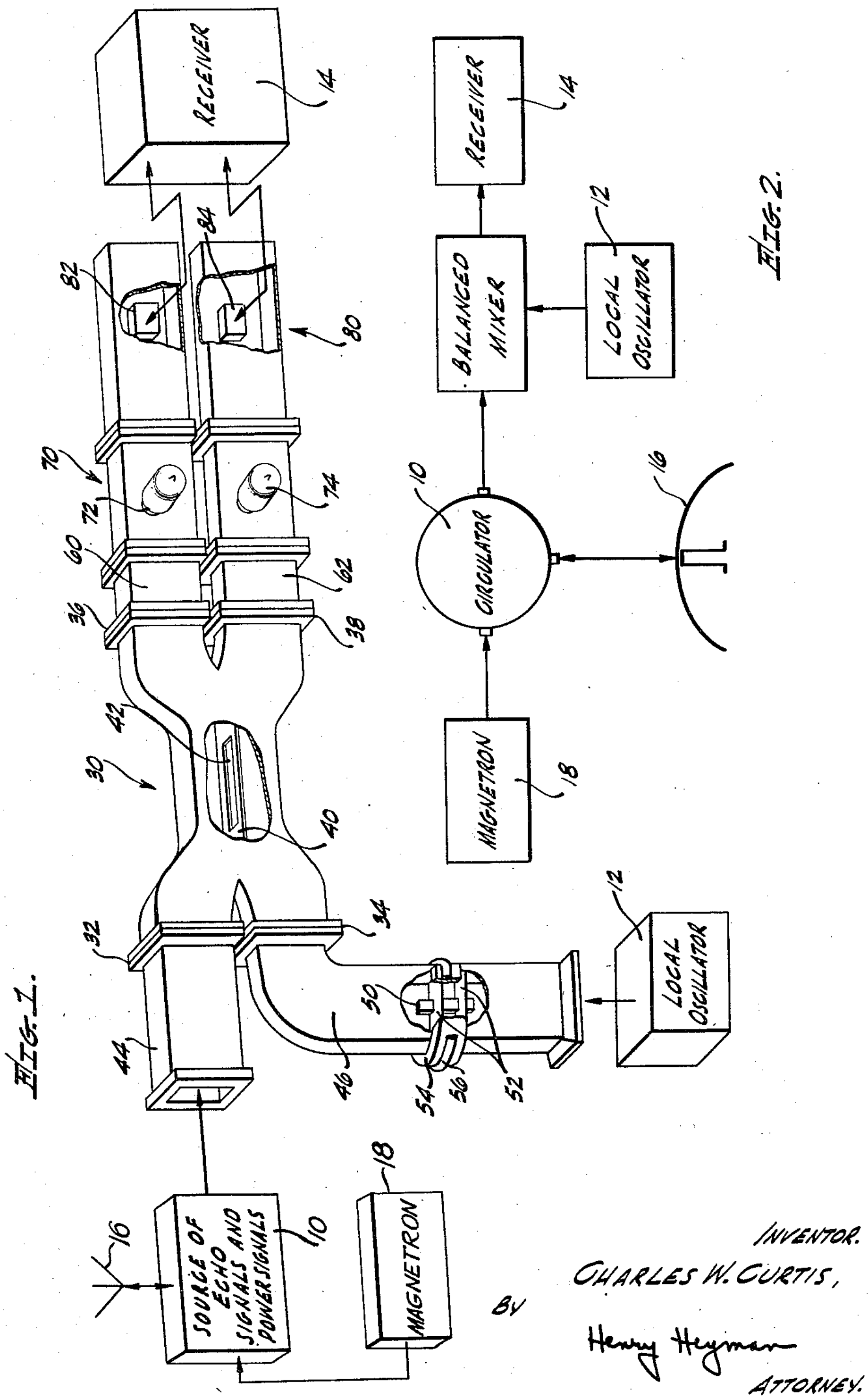

This invention relates to microwave mixers, and particularly to balanced mixer arrangements for microwave systems employing antireciprocal circulators.

Antireciprocal circulators employing ferrites or other materials are employed in microwave systems for such functions as switching and duplexing. Such circulators permit considerable simplification in the design and construction of microwave systems. Often, however, the circulators are so used as to perform the desired functions without separation of relatively high energy level signals from lower energy level signals. Therefore, in the use of such circulators there is often a need for devices which separate or distinguish high energy pulses, such as transmitted pulses, from lower energy pulses, such as echo or response signals. Thus a superheterodyne receiver may require the balanced mixing of echo signals from an antenna with local oscillator energy, where the echo signals may be provided independently in a train of high power transmission pulses.

Accordingly, it is an object of this invention to provide an improved mixer device, simpler than those heretofore known, for microwave systems employing antireciprocal circulators.

It is a further object of this invention to provide an improved balanced mixer for microwave systems for mixing echo signals provided from transmission signals with signals from an independent power source.

It is a further object of this invention to provide an improved balanced mixer arrangement for microwave systems, which arrangement simply and reliably distinguishes echo pulses from transmission pulses occurring on the same line, and mixes the echo pulses with energy from a local oscillator, for provision to a receiver.

A mixer arrangement, in accordance with the invention, may employ a hybrid junction having four terminals and a central coupling slot. Echo and power signals both may be applied to a first input terminal of the junction, and energy from a local oscillator may be applied through a coupling waveguide to a second input terminal of the junction. A differential ferrite attenuator may be employed to provide unidirectional energy propagation in the coupling between the local oscillator and the junction. A dual transmit-receive tube arrangement may be coupled to the two output terminals of the junction so as to reflect back to the junction energy at an energy level of the magnitude of the transmission pulses, or of transmission pulses which have been internally reflected within the system. The energy thus reflected back, when diverted into the coupling waveguide, is absorbed in the ferrite attenuator. Echo signals and local oscillator energy from the junction pass through the dual transmit-receive tubes and are mixed in a balanced crystal mixer arrangement which provides the desired mixed output for the receiver.

The novel features of this invention, as well as the invention itself, both as to its organization and method of operation, will best be understood from the following description, taken in conjunction with the accompanying drawing, in which like reference numerals refer to like parts, and in which:

Fig. 1 is a representation, partly in perspective and partly in block diagram form, of a mixer arrangement in accordance with the invention, and Fig. 2 is a schematic diagram showing the employment of a mixer arrangement, in accordance with the invention, as used with an associated microwave system.

A balanced mixer assembly, in accordance with the invention, may derive signals from a source of echo and power signals 10 and a local oscillator 12, and mix these signals selectively for provision to a receiver 14, such as a heterodyne receiver. The arrangement may include a microwave hybrid coupling junction 30 having four ports or terminals 32, 34, 36, 38. Two of the terminals are herein designated as the first and second input terminals 32, 34 respectively, and the remaining two ports are designated as the first and second output terminals 36, 38 respectively. As shown, the central portion of the hybrid junction 30 includes a rectangular waveguide section including a central strip 40 having an internal coupling slot 42. Microwave hybrids, of the magic T or rat race type, may be employed if desired.

The first terminal 32 of the hybrid junction 30 may be coupled to the source of echo and power signals 10 by means including a rectangular waveguide 44. The second terminal 34 of the junction 30 is coupled to and responsive to the local oscillator 12 by means which may include a rectangular waveguide 46 which may, as shown, include a 90° bend. An elongated ferromagnetic ceramic, or ferrite element 50 may be mounted within the rectangular waveguide 46 at a point between the oscillator 12 and the second terminal 34 of the junction 30. The ferrite element 50 is disposed within and at one side of the waveguide 46, between the center line and a side of the waveguide 46. The direction of elongation of the ferrite element 50 is substantially parallel to the rectangular waveguide 46 axis. Cards 52, preferably of high temperature dielectric material, maintain the ferrite element 50 in position. A magnetic field is applied to the ferrite element 50 by a U-shaped permanent magnet 54. The direction of the magnetic field is transverse to the direction of elongation of the ferrite element 50. The strength of the magnetic field is selected such that, for the length of the ferrite and the frequency of the local oscillator 12, there is substantial resonance absorption of energy propagated toward the oscillator 12, but little absorption of energy propagated away from the oscillator 12. Thus, the ferrite element 50 subjected to a predetermined field provides a differential ferrite attenuator. The U-shaped permanent magnet 54 encompasses a portion of the waveguide 46 and is maintained in position by a strap 56 or other coupling member. The magnet 54 provides a field substantially coextensive with the ferrite element 50.

The first and second output terminals 36, 38 respectively, of the junction 30 may be coupled through means including rectangular waveguides 60, 62 to a microwave switch assembly 70 including first and second transmit-receive tubes 73, 74 respectively. Any of a number of TR tubes well known in the art may be employed in the microwave switch 70. A balanced crystal mixer arrangement 80, shown in simplified form and including first and second crystal members 82, 84 respectively, may couple the dual TR tube arrangement 70 to the receiver 14.

As shown in Fig. 2, the arrangement of Fig. 1 may be employed with a system using an antireciprocal circulator 10 as the source of echo and power signals of Fig. 1. The independent source of echo signals therefore is an antenna 16, while the independent source of power signals may be a magnetron 18. The antenna 16 and magnetron 18 are each coupled to a different port of the circulator 10, but may both provide signals through the circulator 10 to the associated system. The term power signals, as here employed, is intended to include both the initial transmission pulses provided from a source such as the magnetron 18 and also internally reflected signals within the system of a magnitude distinguishable from the lower energy echo signals derived at the atenna 16.

In operation, signals are provided to the balanced mixer arrangement in a manner which is best described with reference to Fig. 2. A relatively high-power transmission pulse, in accordance with conventional pulse system techniques, is employed to begin a discrete cycle of an operation. The high-power transmission pulse from the magnetron 18 is directed through the antireciprocal circulator 10, which so operates as to divert the signal for radiation to the antenna 16. The operation of such an antireciprocal circulator 10 is well known and is therefore omitted for simplicity and clarity in the present description. Echo energy provided to the antenna after reflection from some point in space is diverted through the antireciprocal circulator 10 to the present balanced mixer arrangement shown more completely in Fig. 1. The arrangement employed with the circulator 10 may also cause undesired reflection pulses from the transmission energy to be diverted through the circulator 10 toward the mixer assembly. It is desired to mix only the echo or response energy derived from the antenna 16 with the radio frequency energy derived from the local oscillator 12.

Referring now to Fig. 1, the balanced mixer assembly operates to mix echo signals from the source 10 with independent energy from the local oscillator 12, and to provide these mixed signals to the receiver 14. The echo and reflected power signals from the source 10 are applied directly to the first input terminal 32 of the hybrid junction 30. Local oscillator signals are provided through the rectangular waveguide 46 to the second input terminal 34 of the hybrid junction 30. The ferrite element 50 within the rectangular waveguide 46 is so placed and so magnetized, as described above, as to provide relatively little absorption of signals provided from the oscillator 12. In accordance with conventional hybrid junction action, each of the signals applied separately to the input terminals 32, 34 of the junction 30 are split equally at the coupling slot 42 into two streams, and provided from the output terminals 36 and 38. The two separate wave energy streams are applied through the coupled waveguides 60, 62 to the dual TR tube assembly 70. Assume first that echo signals, and not transmission signals, are provided at a subject instant in time, together with the oscillator signals. Thus the level of the energy is not sufficiently high to fire the TR tubes 72, 74. Therefore, the echo and oscillator signals pass through the dual TR tube assembly 70, which are preferably substantially alike in characteristics, to the balanced crystal mixer arrangement 80. The two crystals 82, 84 in conventional fashion together provide balanced mixed signals to the receiver 14.

If power signals, including internally reflected power signals, are provided from the source of signals 10 to the first input terminal 32, energy transferred through the hybrid junction 30 to the first output terminals 36, 38 is sufficiently high to fire the associated TR tubes 72, 74. Thus, the power signal is reflected away from the crystal mixer 80, which might be damaged by the application of such power levels. The TR tubes 72, 74 are substantially equally spaced from the junction 30 and so placed that reflected signals are directed back through the junction 30 toward the second input terminal 32, 34. Signals provided through the second input terminal 34 (Fig. 1) of the junction 30 are directed in the rectangular waveguide 46 toward the local oscillator 12. The ferrite element 50 forming the differential attenuator within the rectangular waveguide 46 absorbs substantially all the energy passing through the waveguide 46 toward the oscillator 12. Thus the oscillator 12 is likewise protected from injurious effects due to reflected high energy signals.

Thus there has been described an improved balanced mixer arrangement for use in microwave systems. The arrangement is characterized by simplicity and economy, and is particularly suited for employment with microwave systems using antireciprocal circulators, and systems requiring effective isolation between system elements.

What is claimed is:

1. A balanced mixer assembly comprising a hybrid junction, said junction including a pair of input terminals and a pair of output terminals, means providing a first signal, which is to be mixed, to a first of said input terminals, means providing a second input signal, which is to be mixed, to a second of said input terminals, means coupled to each of the output terminals of said hybrid junction for switching signals according to the energy level of said signals, a crystal mixer assembly coupled to both said output arms and responsive to said means for switching signals, and unidirectional power absorbing means in the coupling between the source of second input signals and the second input terminal of said hybrid junction for absorbing signals passing in the coupling in a direction toward said source of second input signals.

2. A microwave arrangement for mixing only echo signals from a source of echo signals and power signals with energy from an oscillator, said arrangement comprising: a hybrid coupling junction having two input terminals, two output terminals, and an internal coupling slot, a first of said input terminals being coupled to the source of echo and power signals, means including a waveguide coupling the second of said input terminals to the local oscillator, a ferrite element mounted within the waveguide between the second input terminal of the junction and the oscillator, a permanent magnet adjacent the waveguide and in operative relation to said ferrite element, said magnet and ferrite element providing a differential attenuator absorbing energy passing in a predetermined direction in said waveguide, dual transmit-receive tube means coupled to both output terminals of said junction and reflecting back substantially all energy in energy pulses having energy levels greater by a predetermined amount than normal echo signals, a balanced crystal mixer arrangement coupled to said dual transmit-receive tubes and providing a mixed output, and receiver elements coupled to said balanced mixer crystal arrangement for utilizing the mixed output provided from said arrangement.

3. An arrangement for mixing, with signals from an independent source, signals of less than a predetermined energy level occurring in a train of signals which may include signals of substantially greater energy level, said system comprising: means responsive to the train of signals and coupled to the independent source of signals for combining signals provided from the two sources into two mixed trains of signals; means coupled to said means for combining and responsive to said two mixed trains of signals for reflecting all energy above a predetermined level; balanced mixer means coupled to said means for reflecting back energy for mixing unreflected energy flowing in the two trains; and means operatively associated with the coupling between said independent source of signals and said means for combining signals for absorbing reflected energy from said means for reflecting.

4. A microwave arrangement for mixing for a receiver echo signals from a source of echo and power signals with energy from a local oscillator, said arrangement comprising: a four terminal hybrid junction having a central coupling section including a central coupling slot and providing equal signals on both the opposite terminals from signals applied to any one terminal, a first of the terminals being coupled to the source of echo and power signals; means including a rectangular waveguide coupling a second of the terminals to the local oscillator; means including rectangular waveguides and dual transmit-receive tubes coupled to the third and fourth terminals of said junction and reflecting back toward said junction all energy in pulses occurring above a predetermined energy level greater than said echo signals but less than the normal power signal, said dual transmit-receive tubes being placed with respect to said junction such that reflected energy is transferred to said second terminal; means including a balanced crystal mixer arrangement coupled to said dual transmit-receive tube and responsive to signals therefrom and applying balanced mixed signals to said receiver; an elongated ferrite element mounted within said rectangular waveguide with its direction of elongation parallel to the axis of said waveguide, said ferrite element being positioned betwen the centerline and a wall of said waveguide; and a U-shaped permanent magnet mounted on said rectangular waveguide adjacent said elongated ferrite element and providing a magnetic field of predetermined polarization transverse to said elongated ferrite element and substantially coextensive therewith.

References Cited in the file of this patent

UNITED STATES PATENTS

| | | |
|---|---|---|
| 2,568,090 | Riblet | Sept. 18, 1951 |
| 2,664,502 | Roberts | Dec. 29, 1953 |

OTHER REFERENCES

Article, "A Nonreciprocal Microwave Component" by Kales et al., Journal of Applied Physics, vol. 24, No. 6, pp. 816–817, June 1953.